United States Patent [19]

Yamamoto et al.

[11] Patent Number: 4,902,742

[45] Date of Patent: Feb. 20, 1990

[54] THERMOPLASTIC POLYMETHACRYLIMIDE RESIN COMPOSITION

[75] Inventors: Naoki Yamamoto, Hiroshima; Kozi Nishida; Akira Yanagase, both of Otake, all of Japan

[73] Assignee: Mitsubishi Rayon Co., Ltd., Tokyo, Japan

[21] Appl. No.: 243,929

[22] Filed: Sep. 13, 1988

[30] Foreign Application Priority Data

Sep. 18, 1987 [JP] Japan ................................ 62-234050

[51] Int. Cl.$^4$ ............................................. C08L 51/08
[52] U.S. Cl. ........................................................ 525/63
[58] Field of Search ............................................ 525/63

[56] References Cited

U.S. PATENT DOCUMENTS

| 3,686,356 | 8/1972 | Saam ..................................... 525/63 |
| 4,246,374 | 1/1981 | Kopchik ............................. 525/329 |
| 4,690,986 | 9/1987 | Sasaki et al. ........................ 525/479 |

FOREIGN PATENT DOCUMENTS 216505 4/1987 European Pat. Off. .

Primary Examiner—Melvyn I. Marquis
Attorney, Agent, or Firm—Brumbaugh, Graves, Donohue & Raymond

[57] ABSTRACT

A polymethacrylimide resin composition having an improved impact resistance and thermal resistance is prepared by blending a polymethacrylimide resin with a polyorganosiloxane type graft copolymer formed by graft-polymerizing at least one ethylenically unsaturated monomer onto a polyorganosiloxane rubber copolymerized with a graft-crosslinking agent.

14 Claims, No Drawings

THERMOPLASTIC POLYMETHACRYLIMIDE RESIN COMPOSITION

BACKGROUND OF THE INVENTION (1) Field of the Invention

The present invention relates to a polymethacrylimide resin composition having an excellent impact resistance and heat resistance. More particularly, the present invention relates to a polymethacrylimide resin composition comprising a polymethacrylimide resin and a specific organosiloxane type graft copolymer.

(2) Description of the Related Art

A polymethacrylimide resin has an excellent heat resistance, transparency, and rigidity and is expected to be used as a new engineering plastic material, but the use of this resin is restricted because of a poor impact resistance thereof.

As a means for improving the impact resistance of a polymethacrylimide resin, a process in which a polybutadiene type graft rubber is incorporated in the polymethacrylimide resin is disclosed in Japanese Unexamined Patent Publication No. 52-63,989, but in this process, since unsaturated bonds remain in the polybutadiene type graft rubber, the resin composition is thermally unstable and a valuable resin composition having an excellent heat stability cannot be obtained in practice.

Furthermore, a process in which the processability and impact resistance of a polymethacrylimide resin are improved by incorporating a polyolefin such as an ethylene/propylene copolymer into the polymethacrylimide resin is disclosed in Japanese Examined Patent Publication No. 59-42,017. In this process, to obtain a good impact strength and melt flowability, a polymer of a specific vinyl monomer must be added as the third component, and the inherent heat resistance of the polymethacrylimide resin is sacrificed.

SUMMARY OF THE INVENTION

The inventors carried out research into the development of a process for improving the impact resistance of a polymethacrylimide resin while retaining the inherent excellent heat resistance and mechanical strength of the polymethacrylimide resin, and as a result, found that, if a polyorganosiloxane type graft copolymer obtained by graft-polymerizing a vinyl monomer onto a polyorganosiloxane rubber is incorporated in a polymethacrylimide resin, a good compatibility is obtained between the two resins, and this resin composition results in a molded article having a greatly improved impact resistance without laminar peeling, and further having an excellent heat resistance, mechanical strength, moldability, and flowability, and the present invention was completed based on this finding.

In accordance with the present invention, there is provided a polymethacrylimide resin composition comprising (A) a polymethacrylimide resin and (B) a polyorganosiloxane type graft copolymer formed by graft-polymerizing at least one ethylenically unsaturated monomer onto a polyorganosiloxane rubber copolymerized with a graft-crosslinking agent.

DESCRIPTION OF THE PREFERRED EMBODIMENTS

A polymethacrylimide resin containing at least 5% by weight of imide ring structural units represented by the following formula (1):

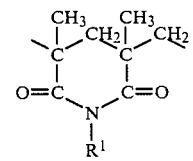

wherein $R^1$ represents a hydrogen atom, or an alkyl, cycloalkyl, aryl, alkaryl, aralkyl or allyl group having 1 to 20 carbon atoms, is preferably used as the polymethacrylimide resin in the present invention.

Any polymer having the above-mentioned imide ring structural units can be used, but polymers in which $R^1$ is a hydrogen atom, a methyl group, an ethyl group, a propyl group, a butyl group, a phenyl group or a cyclohexyl group are usually used.

The process for the preparation of the polymethacrylimide resin is not particularly critical, but a process in which a methacrylate resin is reacted with ammonia or a primary amine (referred to as imidizing agent hereinafter) in an inert solvent at a temperature of 150° to 350° C. is advantageous. As the primary amine, methylamine, ethylamine, propylamine, butylamine, aniline and cyclohexylamine can be advantageously used. At least one member selected from aromatic hydrocarbons such as benzene, toluene and xylene and aliphatic alcohols such as methanol, ethanol and propanol, or a mixed solvent of two or more thereof, is preferably used as the inert solvent.

Preferably, the imide ring structural units represented by the above-mentioned formula (1) are contained in an amount of at least 5% by weight, especially at least 20% by weight. If the content of the ring structural units is too low, it is difficult to obtain a resin composition having a high heat distortion temperature.

As the methacrylate resin used for formation of the polymethacrylimide resin, there can be mentioned, for example, a homopolymer of a methacrylic acid ester and a copolymer of a methacrylic acid ester with a copolymerizable ethylenically unsaturated monomer such as another methacrylic acid ester, an acrylic acid ester, acrylic acid, methacrylic acid, styrene or a substituted styrene such as α-methylstyrene.

As the methacrylic acid ester, there can be mentioned, for example, methyl methacrylate, ethyl methacrylate, propyl methacrylate, n-butyl methacrylate, isobutyl methacrylate, tert-butyl methacrylate, cyclohexyl methacrylate, norbonyl methacrylate, 2-ethylhexyl methacrylate, and benzyl methacrylate. Of these, methyl methacrylate is especially preferred. As the acrylic acid ester, there can be mentioned, for example, methyl acrylate, ethyl acrylate, propyl acrylate, n-butyl acrylate, isobutyl acrylate, tert-butyl acrylate, cyclohexyl acrylate, norbonyl acrylate, 2-ethylhexyl acrylate, and benzyl acrylate. Of these, methyl acrylate and ethyl acrylate are preferred. These monomers can be used singly or as a mixture of two or more thereof.

In the present invention, preferably a homopolymer of methyl methacrylate and a copolymer comprising at least 25% by weight of methyl methacrylate and up to 75% by weight of other monomer as mentioned above are used as the methacrylic resin, and in view of the transparency, more preferably a homopolymer of methyl methacrylate is used.

The polyorganosiloxane type graft copolymer referred to in the present invention is a polymer obtained by graft-polymerizing at least one ethylenically unsaturated monomer such as a vinyl monomer or a vinylidene monomer to a polyorganosiloxane rubber copolymerized with a graft-crosslinking agent.

Preferably, the content of the polyorganosiloxane rubber in this polyorganosiloxane type graft copolymer is 5 to 90% by weight. The polyorganosiloxane rubber comprises three components, i.e., an organosiloxane, a graft-crosslinking agent and a crosslinking agent.

As the organosiloxane constituting the polyorganosiloxane rubber, there can be mentioned, for example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane. These siloxanes can be used singly or as a mixture of two or more thereof. The siloxane is used in an amount of at least 50% by weight in the polyorganosiloxane rubber, and preferably an amount of at least 70% by weight is used.

Organosiloxane compounds represented by the following general formula:

$$CH_2=\underset{R_3}{C}-COO+CH_2)_{\overline{p}}SiR_n^2O_{(3-n)}/2, \quad (2)$$

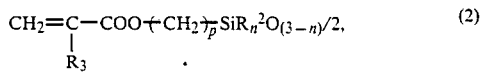

$$CH_2=CH-SiR_n^2O_{(3-n)}/2 \quad (3)$$

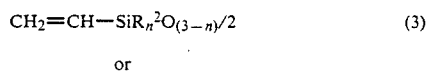

or $$HS+CH_2)_{\overline{p}}SiR_n^2O_{(3-n)}/2 \quad (4)$$

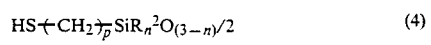

wherein $R^2$ stands for a methyl group, an ethyl group, a propyl group or phenyl group, $R^3$ stands for a hydrogen atom or a methyl group, n is 0, 1 or 2 and p is a number of from 1 to 6, is used as the graft-crosslinking agent. The methacryloyloxysiloxane or acryloyloxysiloxane represented by the general formula (2) is advantageous in use because the graft efficiency is high, an effective grafting chain can be formed, and the impact resistance is effectively manifested. Methacryloyloxysiloxane is especially preferred as the siloxane represented by the general formula (2).

The graft-crosslinking agent is used in an amount of 0.1 to 20% by weight, preferably 0.1 to 10% by weight, in the polyorganosiloxane rubber.

As the crosslinking agent, there can be used trifunctional and tetrafunctional siloxane type crosslinking agents such as trimethoxymethylsilane, triethoxyphenylsilane, tetramethoxysilane, tetraethoxysilane, and tetrabutoxysilane. The crosslinking agent is used in an amount of 0.2 to 30% by weight in the polyorganosiloxane rubber.

Processes disclosed in the specifications of U.S. Pat. No. 2,891,920 and U.S. Pat. No. 3,294,725 can be used for the polymerization for obtaining this polyorganosiloxane rubber. In the present invention, there is preferably adopted, for example, a process in which a mixed solution of the organosiloxane, graftcrosslinking agent, and crosslinking agent is mixed under shearing with water in the presence of an emulsifier such as an alkylbenzene-sulfonic acid or alkylsulfonic acid. The alkylbenzenesulfonic acid is preferred because it acts not only as an emulsifier for the organosiloxane but also as a polymerization initiator. If the alkylbenzene-sulfonic acid is used in combination with a metal salt of an alkylbenzene-sulfonic acid or a metal salt of an alkylsulfonic acid, an effect can advantageously be attained of maintaining the polymer stably during the graft polymerization, and this combined use is preferred.

Preferably, the average particle diameter of the polyorganosiloxane rubber obtained by the polymerization is in the range of 0.06 to 0.6 μm. If the average particle diameter is smaller than 0.06 μm, the impact resistance of a molded article formed from the obtained resin composition is lowered, and if the average particle diameter exceeds 0.6 μm, the impact resistance of a molded article formed from the obtained composition is lowered and the appearance of the surface of the molded article is spoilt.

As the ethylenically unsaturated monomer to be graft-polymerized to this polyorganosiloxane rubber, there can be mentioned aromatic alkenyl compounds such as styrene, and α-methylstyrene; methacrylic acid esters such as methyl methacrylate, ethyl methacrylate, propyl methacrylate and 2-ethylhexyl methacrylate; acrylic acid esters such as methyl acrylate, ethyl acrylate, and butyl acrylate; and nitriles such as acrylonitrile and methacrylonitrile. These vinyl monomers can be used singly or as a mixture of two or more thereof. Of these vinyl monomers, styrene and methyl methacrylate are especially preferred.

The ratio between the ethylenically unsaturated monomer and the polyorganosiloxane rubber is such that the amount of the polyorganosiloxane rubber is 5 to 90% by weight based on the polyorganosiloxane type graft copolymer and the amount of the ethylenically unsaturated monomer is 95 to 10% by weight based on the polyorganosiloxane type graft copolymer. If the amount of the polyorganosiloxane rubber is smaller than 5% by weight, the intended effect of improving the impact resistance of the resin composition of the present invention is not obtained, and if the amount of the polyorganosiloxane rubber exceeds 90% by weight, no effect can be attained by grafting.

This polyorganosiloxane type graft copolymer can be prepared according to a customary emulsion polymerization process. More specifically, the polyorganosiloxane type graft copolymer can be prepared by neutralizing a polyorganosiloxane rubber latex with an alkali and polymerizing the above-mentioned ethylenically unsaturated monomer is one stage or a plurality of stages by the radical polymerization technique.

The obtained polyorganosiloxane type graft copolymer can be separated for recovery by pouring the obtained polyorganosiloxane type graft copolymer latex into hot water containing a metal salt such as calcium chloride or magnesium sulfate dissolved therein and carrying out salting-out for coagulation.

The recovered polyorganosiloxane type graft copolymer is dried, to obtain a mixture of a polymer not containing the graft-polymerized ethylenically unsaturated monomer, which has been formed at the graft polymerization step, and a graft polymer bonded to the polyorganosiloxane rubber. The ratio of bonding of the graft polymer to the polyorganosiloxane rubber, i.e., the grafting ratio, is an important factor in the manifesting of an impact strength in the polymethacrylimide resin. Namely, a good affinity is obtained between the polymethacrylimide resin and the polyorganosiloxane rubber through a grafting chain, and the grafting ratio should be at least 10%, preferably at least 30%. Ethylenically unsaturated monomers as mentioned above can be used singly or as a mixture of two or more thereof for the graft polymerization. A combination of styrene and methyl methacrylate is preferred.

A formation of a small amount of the free polymer not bonded to the polyorganosiloxane rubber during the graft polymerization cannot be avoided, but in view of the moldability and flowability, preferably the amount of the free polymer formed is as small as possible. More specifically, since the ratio of the ethylenically unsaturated monomer participating in the graft bonding to the entire ethylenically unsaturated monomer used for the graft polymerization, i.e., the so-called graft efficiency, is greatly changed according to the kind of graft-crosslinking agent copolymerized in the polyorganosiloxane rubber, and as pointed out hereinabove, if a methacryloyloxysiloxane or acryloyloxysiloxane represented by the general formula (2), preferably the methacryloyloxysiloxane, is used as the graft-crosslinking agent, the grafting efficiency is highest and the moldability and flowability are improved.

In the resin composition of the present invention, the polymethacrylimide resin component (A) can be mixed with the polyorganosiloxane type graft copolymer component (B) at a broad mixing ratio. In the resin composition of the present invention, preferably the amount of the polymethacrylimide resin (A) is 60 to 99% by weight based on the total resin composition and the amount of he polyorganosiloxane type graft, copolymer (B) is 1 to 40 % by weight based on the total resin composition.

If the amount of the polyorganosiloxane type graft copolymer (B) is smaller than 1% by weight, the improvement of the impact resistance is not satisfactory, and if the amount of the polyorganosiloxane graft copolymer is larger than 40% by weight, the mechanical strength is decreased because of a high polyorganosiloxane rubber content, and the durability is lowered.

The resin composition of the present invention has an excellent heat resistance and impact resistance, especially an impact resistance at low temperature, and the levels of the heat resistance and impact resistance can be freely set by changing the mixing ratio of the above-mentioned components (A) and (B).

The resin composition of the present invention can be prepared by mixing and pelletizing the components (A) and (B) by using a known apparatus such as a Banbury mixer, a roll mill or a twin-screw extruder.

A stabilizer, a plasticizer, a lubricant, a flame retardant, a pigment, a filler, and the like can be incorporated into the resin composition of the present invention according to need. For example, there can be mentioned stabilizers such as triphenyl phosphite, lubricants such as polyethylene wax and polypropylene wax, phosphate type flame retardants such as triphenyl phosphate and tricresyl phosphate, bromine type flame retardants such as decabromobiphenyl and decabromobiphenyl ether, pigments such as titanium oxide, zinc sulfide and zinc oxide, and fillers such as glass fiber, asbestos, wollastonite, mica and talc.

The present invention will now be described in detail with reference to the following examples.

In the following examples and comparative examples, the physical properties were measured by the methods described below.

Flexural strength:
The flexural strength was measured according to the method of ASTM D-790.

Izod impact strength:
The Izod impact strength was measured according to the method of ASTM D-256 (with ¼", notch).

Heat distortion temperature:
The heat distortion temperature was measured under a load of 18.56 kg according to the method of ASTM D-648.

Melt index:
The melt index was measured according to the method of ASTM D-1238 (at 260° C. under a load of 10 kg).

In the following examples, % and parts are by weight unless otherwise specified.

REFERENTIAL EXAMPLE 1

Preparation of Polymethacrylimide Resin

An autoclave was charged with 100 parts of a thoroughly dried methyl methacrylate polymer, 100 parts of toluene, 10 parts of methanol, and an imidizing agent shown in Table 1, and the reaction was carried out at 230° C. with stirring. The obtained polymer was fed into an extruder and extruded at a resin temperature of 260° C. while removing volatile components from a vent hole, whereby a pellet was prepared.

The characteristics of the obtained pellet are shown in Table 1.

TABLE 1

| Kind of Polymethacryl-imide Resin | Imidizing Agent Kind | Imidizing Agent Amount (parts) | Imide Ring Structure Content (%) | Heat Distortion Temperature (°C.) |
|---|---|---|---|---|
| A-1 | Methylamine | 20 | 76 | 142 |
| A-2 | Methylamine | 30 | 97 | 169 |
| A-3 | Ammonia | 20 | 62 | 156 |

REFERENTIAL EXAMPLE 2

Preparation of Polyorganosiloxane Type Graft Copolymer S-1

A mixed siloxane (100 parts) was prepared by mixing 6 parts of tetraethoxysilane, 2 parts of γ-methacryloyloxypropyldimethoxymethylsilane, and 92 parts of octamethylcyclotetrasiloxane. Then, 100 parts of the mixed siloxane was added to 300 parts of distilled water containing 1 part of sodium dodecylbenzene-sulfonate and 1 part of dodecylbenzenesulfonic acid dissolved therein, and the mixture was preliminarily stirred at 10,000 rpm and twice passed through a homogenizer under a pressure of 300 kg/cm² to effect emulsification and dispersion and obtain an organosiloxane latex. The mixed liquid was transferred to a separable flask equipped with a condenser and a stirring vane and heated with stirring at 80° C. for 5 hours and cooled at 10° C. for 20 hours. Then, the latex was neutralized to a pH value of 6.9 with an aqueous solution of sodium hydroxide, whereby polymerization was completed. The rate of polymerization for the obtained polyorganosiloxane rubber was 90.8%, and the particle size of the polyorganosiloxane rubber was 0.14 μm.

A separable flask equipped with a stirrer was charged with 264 parts of the obtained polyorganosiloxane rubber latex, the inner atmosphere was replaced by nitrogen, and the temperature was elevated to 80° C. Then, a mixed solution of 15 parts of styrene, 25 parts of methyl methacrylate, and 0.16 part of tertiary butyl peroxide was added, and the mixture was stirred for 30 minutes. A mixed solution of 0.2 part of Rongalit, 0.0004 part of ferrous sulfate, 0.008 part of disodium ethylenediaminetetraacetate, and 5 parts of distilled water was then charged to start radical polymerization, the reaction temperature was maintained for 6 hours, and the reaction mixture was then cooled to complete the polymerization. The polymerization conversion of styrene and methyl methacrylate at the graft polymerization was 92%, the grafting ratio of the obtained graft copolymer was 52%, and the graft efficiency was 78%. The obtained latex was dropped into 456 parts of hot water containing calcium chloride at a concentration of 1.5% by weight, to coagulate the polymer. The polymer was separated, washed, and dried at 75° C. for 10 hours, to remove water and obtain a dry powder of polyorganosiloxane type graft copolymer S-1.

REFERENTIAL EXAMPLE 3

Preparation of Polyorganosiloxane Type Graft Copolymers S-2 to S-4

Polymerization of the polyorganosiloxane rubber and graft polymerization were carried out in the same manner as described in Referential Example 2 except that, at the polymerization of the polyorganosiloxane rubber in Referential Example 2, 2 parts of γ-mercaptopropyldimethoxymethylsilane, 2 parts of tetramethyltetravinylcyclosiloxane or 2 parts of γ-methacryloyloxypropyltrimethoxysilane was used as the graft-crosslinking agent instead of γ-methacryloyloxypropyldimethoxymethylsilane, whereby dry powders of graft copolymers S-2 to S-4 were obtained. The results of the polymerization of the polyorganosiloxane rubber and the graft polymerization are shown in Table 2.

EXAMPLES 1 THROUGH 12 AND COMPARATIVE EXAMPLES 1 THROUGH 3

Compositions were prepared by mixing 82.7% by weight of the polymethacrylimide resin A-1, A-2 or A-3 obtained in Referential Example 1 with 17.3% by weight of the polyorganosiloxane type graft copolymer S-1, S-2, S-3 or S-4 obtained in Referential Example 2 or 3 (Examples 1 through 12).

For comparison, the resins A-1 through A-3 were used as they were (Comparative Examples 1 through 3).

Each composition was fed into a twin-screw extruder (Model ZSK-30- supplied by Werner-Pfleiderer) and meltkneaded and pelletized at a cylinder temperature of 280° C. The obtained pellet was dried and fed into an injection molding machine (Model SJ-35A supplied by Meiki Co., Ltd.), and injection molding was carried out at a cylinder temperature of 280° C. and a mold temperature of 60° C. The physical properties of the obtained test pieces were evaluated, and the results are shown in Table 3.

TABLE 3

| | | Kind of Polymethacryl-imide Resin | Kind of Polyorgano-siloxane Graft Copolymer | Flexural Strength (kg/cm$^2$) | Izod Impact Strength (with ¼", notch, 23° C.) (kg · cm/cm) | Heat Distortion Temperature (°C.) | Melt Index (230° C. load of 10 kg) (g/10 min) |
|---|---|---|---|---|---|---|---|
| Example No. | 1 | A-1 | S-1 | 1350 | 15 | 140 | 11.0 |
| | 2 | A-1 | S-2 | 1350 | 13 | 140 | 8.0 |
| | 3 | A-1 | S-3 | 1350 | 10 | 140 | 7.0 |
| | 4 | A-1 | S-4 | 1350 | 14 | 140 | 8.0 |
| | 5 | A-2 | S-1 | 1400 | 14 | 160 | 5.0 |
| | 6 | A-2 | S-2 | 1400 | 13 | 160 | 4.0 |
| | 7 | A-2 | S-3 | 1400 | 9 | 161 | 3.5 |
| | 8 | A-2 | S-4 | 1400 | 13 | 159 | 4.5 |
| | 9 | A-3 | S-1 | 1300 | 10 | 155 | 7.0 |
| | 10 | A-3 | S-2 | 1300 | 7 | 155 | 5.0 |
| | 11 | A-3 | S-3 | 1300 | 5 | 155 | 4.0 |
| | 12 | A-3 | S-4 | 1300 | 8 | 155 | 6.0 |
| Comparative Example No. | 1 | A-1 | — | 1400 | 1.7 | 142 | 3.0 |
| | 2 | A-2 | — | 1400 | 1.7 | 169 | 1.5 |
| | 3 | A-3 | — | 1350 | 1.9 | 156 | 2.0 |

From the results obtained in the examples and comparative examples, it is seen that the impact resistance and flowability were greatly improved in the resin compositions of the examples. In the resin compositions of Examples 1, 5, 9, 4, 8, and 12, γ-methacryloyloxypropyldimethoxymethylsilane and γ-methacryloyloxypropyltrimethoxysilane were used as the graft-crosslinking agent, and in the resin compositions of Examples 2, 6, 10, 3, 7, and 11, γ-mercaptopropyldimethoxysilane and tetramethyltetravinylcyclosiloxane were used as the graft-crosslinking agent. It is seen that the former resin compositions were superior to the latter compositions in Izod impact strength and melt index. This is due

TABLE 2

| Kind of Dry Powder | Kind of Graft-Crosslinking Agent | Polymerization of Polyorgano-siloxane Rubber | | Graft Polymerization | | |
|---|---|---|---|---|---|---|
| | | Rate of Polymerization (%) | Particle Size of Rubber (μm) | Grafting Ratio (%) | Graft Efficiency (%) | Polymerization Conversion of Styrene-Methyl Methacrylate (%) |
| S-2 | γ-Mercaptopropyldime-thoxymethylsilane | 90.2 | 0.14 | 32 | 48 | 92 |
| S-3 | Tetramethyltetravinyl-cyclosiloxane | 90.6 | 0.14 | 14 | 21 | 93 |
| S-4 | γ-Methacryloyloxypropyl-trimethoxysilane | 90.8 | 0.14 | 56 | 84 | 92 | to the difference of the graft efficiency, as when the graft efficiency is high, even if the polymethacrylimide resin is combined with the polyorganosiloxane type graft copolymer, the impact resistance can be improved without inhibiting the flowability.

EXAMPLES 13 THROUGH 16 AND COMPARATIVE EXAMPLE 4

The polymethacrylimide resin A-1 obtained in Referential Example 1 was mixed with the polyorganosiloxane type graft copolymer S-1 obtained in Referential Example 2 at various mixing ratios (Examples 13 through 16).

An MBS resin (a graft copolymer having a butadiene rubber content of 60% and a methyl methacrylate/styrene weight ratio of 25/15) was mixed with the above-mentioned polymethacrylimide resin at a mixing ratio shown in Table 4 (Comparative Example 4).

Each composition was pelletized under the same conditions by using the same twin-screw extruder and injection molding machine as described in the foregoing examples, and the physical properties of the obtained pellet and test piece were evaluated. The results are shown in Table 4.

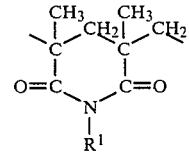

wherein $R^1$ represents a hydrogen atom, or an alkyl, cycloalkyl, aryl, alkaryl, aralkyl or allyl group having 1 to 20 carbon atoms.

3. A polymethacrylimide resin composition according to claim 1, wherein the polymethacrylimide resin (A) comprises at least 20% by weight of the imide ring structural units.

4. A polymethacrylimide resin composition according to claim 1, wherein the polymethacrylimide resin (A) is prepared by reacting a methacrylate resin with ammonia or a primary amine having an alkyl, cycloalkyl, aryl, alkaryl, aralkyl or allyl group having 1 to 20 carbon atoms, at a temperature of 150° to 350° C. in an inert solvent.

5. A polymethacrylimide resin composition accord-

TABLE 4

| | | Amount of Polymethacryl-imide Resin A-1 (%) | Amount of Polyorgano-siloxane Type Graft Copolymer S-1 (%) | MBS Resin (%) | Izod Impact Strength (with ¼", notch, 23° C.) (kg·cm/cm) | Heat Distortion Temperature (°C.) | Melt Index (10 kg, 260° C.) (g/10 min) | Flexural Strength (kg/cm²) |
|---|---|---|---|---|---|---|---|---|
| Example No. | 13 | 92.7 | 7.3 | — | 13 | 140 | 13 | 1350 |
| | 14 | 89.2 | 10.8 | — | 17 | 140 | 10 | 1350 |
| | 15 | 87.5 | 12.5 | — | 20 | 139 | 8 | 1350 |
| | 16 | 83.3 | 16.7 | — | 25 | 138 | 7 | 1350 |
| Comparative Example No. | 4 | 92.7 | — | 7.3 | 6.5 | 138 | 4 | 1200 |

As apparent from the results of Examples 13 through 16 shown in Table 4, the impact strength was increased with an increase of the mixing ratio of the graft copolymer S-1.

When the compositions of these examples are compared with the composition comprising the MBS resin and the polymethacrylimide resin, it is seen that the latter composition has an inferior impact strength, flowability, and mechanical strength.

According to the present invention, a thermoplastic resin composition having an excellent impact resistance, heat resistance, mechanical strength, moldability, and flowability is obtained by the incorporation of a specific polyorganosiloxane type graft copolymer in a polymethacrylimide resin.

We claim:

1. A polymethacrylimide resin composition comprising (A) a polymethacrylimide resin and (B) a polyorganosiloxane type graft copolymer formed by graft-polymerizing at least one ethylenically unsaturated monomer onto a polyorganosiloxane rubber copolymerized with a graft-crosslinking agent.

2. A polymethacrylimide resin composition according to claim 1, wherein the polymethacrylimide resin (A) comprises at least 5% by weight of imide ring structural units represented by the following general formula (1):

ing to claim 4, wherein the methacrylate resin is a homopolymer of methyl methacrylate or a copolymer comprised of at least 25% by weight of methyl methacrylate and not more than 75% by weight of at least one ethylenically unsaturated monomer copolymerizable therewith.

6. A polymethacrylimide resin composition according to claim 1, wherein $R^1$ in the formula (1) is selected from the group consisting of hydrogen, methyl, ethyl, propyl, butyl, phenyl and cyclohexyl.

7. A polymethacrylimide resin composition according to claim 1, wherein the amount of the polyorganosiloxane rubber is 5 to 90% by weight based on the weight of the polyorganosiloxane type graft copolymer (B).

8. A polymethacrylimide resin composition according to claim 1, wherein the polyorganosiloxane rubber is obtained by polymerizing, based on the weight of the polyorganosiloxane rubber, at least 50% by weight of an organosiloxane with 0.1 to 20% by weight of the graft-crosslinking agent and 0.2 to 30% by weight of a crosslinking agent; said graft-crosslinking agent being selected from the group consisting of organosiloxane compounds represented by the following formulae (2), (3) and (4):

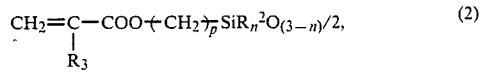

-continued
$$CH_2=CH-SiR_n^2O_{(3-n)/2} \quad (3)$$

and $$HS(CH_2)_{pp}SiR_n^2O_{(3-n)/2} \quad (4)$$

where in $R^2$ stands for a methyl, ethyl, propyl or phenyl group, $R^3$ stands for hydrogen or a methyl group, n is 0, 1 or 2 and pp is a number of from 1 to 6; and said cross-linking agent is a trifunctional or tetrafunctional organosiloxane crosslinking agent different from the graft-crosslinking agent.

9. A polymethacrylimide resin composition according to claim 8, wherein the graft-crosslinking agent is an organosiloxane compound represented by the formula (2).

10. A polymethacrylimide resin composition according to claim 1, wherein the polyorganosiloxane rubber has an average particle diameter of 0.06 to 0.6 μm.

11. A polymethacrylimide resin composition according to claim 1, wherein the polyorganosiloxane type graft copolymer is formed by graft-copolymerizing 10 to 95% by weight, based on the weight of the graft copolymer, of at least one ethylenically unsaturated monomer onto 90 to 5% by weight, based on the weight of the graft copolymer, of the polyorganosiloxane rubber.

12. A polymethacrylimide resin composition according to claim 1, which comprises (A) 60 to 91% by weight, based on the weight of the total resin composition, of the polymethacrylimide resin and (B) 1 to 40% by weight, based on the weight of the total resin composition, of the polyorganosiloxane type graft copolymer.

13. A polymethacrylimide resin composition according to claim 8, wherein the organosiloxane crosslinking agent is selected from the group consisting of trimethoxymethylsilane and triethoxyphenylsilane.

14. A polymethacrylimide resin composition according to claim 8, wherein the tetrafunctional organosiloxane crosslinking agent is selected from the group consisting of tetramethoxysilane, tetraethoxysilane and tetrabutoxysilane.

* * * * *

UNITED STATES PATENT AND TRADEMARK OFFICE
CERTIFICATE OF CORRECTION

PATENT NO. : 4,902,742

DATED : Feb. 20, 1990

INVENTOR(S) : Yamamoto et al.

It is certified that error appears in the above-identified patent and that said Letters Patent is hereby corrected as shown below:

Col. 5, line 28, "he" should read --the--; also line 28, delete the comma after "graft".

Col. 7, line 2, "0.008" should read --0.0008--.

Col. 11, line 8, "where in" should read --wherein--; line 10, "pp" should read -- p --.

Signed and Sealed this

Twenty-fourth Day of September, 1991

Attest:

HARRY F. MANBECK, JR.

Attesting Officer

Commissioner of Patents and Trademarks